(12) United States Patent
Aine

(10) Patent No.: US 10,800,416 B2
(45) Date of Patent: Oct. 13, 2020

(54) VEHICLE CONTROL SYSTEM

(71) Applicant: Apple Inc., Cupertino, CA (US)

(72) Inventor: Sandip Aine, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 49 days.

(21) Appl. No.: 15/707,281

(22) Filed: Sep. 18, 2017

(65) Prior Publication Data

US 2018/0079420 A1 Mar. 22, 2018

Related U.S. Application Data

(60) Provisional application No. 62/397,461, filed on Sep. 21, 2016.

(51) Int. Cl.
*B60W 30/18* (2012.01)
*B62D 15/02* (2006.01)
(Continued)

(52) U.S. Cl.
CPC ... *B60W 30/18163* (2013.01); *B60K 31/0066* (2013.01); *B60W 10/04* (2013.01); *B60W 10/18* (2013.01); *B60W 10/20* (2013.01); *B60W 30/08* (2013.01); *B60W 30/16* (2013.01); *B60W 50/0097* (2013.01); *B62D 15/0255* (2013.01); *G01S 13/86* (2013.01); *G05D 1/0212* (2013.01); *G08G 1/162* (2013.01); *G08G 1/166* (2013.01); *G08G 1/167* (2013.01); *B60W 2520/00* (2013.01); *B60W 2554/00* (2020.02); *B60W 2554/80* (2020.02); *B60W 2554/801* (2020.02);
(Continued)

(58) Field of Classification Search
CPC ..... B60W 30/18163; B60W 2550/308; B60W 30/16; B60W 2550/30; B60W 2550/10; B60W 2520/00; B60W 30/08; B60W 10/20; B60W 10/18; B60W 10/04; B60W 50/0097; G08G 1/167; G08G 1/166; G08G 1/162; G01S 13/86; G01S 2013/9332; G05D 1/0212; G05D 2201/0213; B62D 15/0255; B60K 31/0066
See application file for complete search history.

(56) References Cited

U.S. PATENT DOCUMENTS 5,521,579 A 5/1996 Bernhard
8,170,739 B2 5/2012 Lee
(Continued)

*Primary Examiner* — Michael V Kerrigan
(74) *Attorney, Agent, or Firm* — Young Basile Hanlon & MacFarlane, P.C.

(57) ABSTRACT

Systems and methods for automated control of vehicle lane change maneuvers are disclosed. Some implementations may include detecting, based on data from a sensor in the first vehicle, one or more other vehicles that are moving in a target lane of the road. Some implementations may include determining, based on the kinematic state of the vehicle and a prediction of motion of the one or more other vehicles in the target lane, estimates of headway in relation to at least one of the one or more other vehicles in the target lane. Some implementations may include determining, based at least in part on the estimates of headway, overtake decisions for the one or more other vehicles traveling in the target lane. Some implementations may include determining a motion plan that will transition the first vehicle from the current lane to the target lane based the overtake decisions.

20 Claims, 7 Drawing Sheets

(51) Int. Cl.
  *B60W 30/16* (2020.01)
  *G08G 1/16* (2006.01)
  *B60W 10/04* (2006.01)
  *B60W 30/08* (2012.01)
  *B60W 10/18* (2012.01)
  *B60W 10/20* (2006.01)
  *B60W 50/00* (2006.01)
  *B60K 31/00* (2006.01)
  *G01S 13/86* (2006.01)
  *G05D 1/02* (2020.01)
  *G01S 13/931* (2020.01)

(52) U.S. Cl.
  CPC ............... *G01S 2013/9315* (2020.01); *G05D 2201/0213* (2013.01)

(56) References Cited

U.S. PATENT DOCUMENTS

| | | | |
|---|---|---|---|
| 8,706,417 B2 | 4/2014 | Zeng et al. | |
| 8,914,181 B2 | 12/2014 | Essame et al. | |
| 9,096,267 B2 | 8/2015 | Mudalige et al. | |
| 2013/0085976 A1* | 4/2013 | Bone | B60W 30/18163 706/46 |
| 2014/0032108 A1 | 1/2014 | Zeng et al. | |
| 2015/0154458 A1 | 6/2015 | Lee et al. | |
| 2015/0161895 A1 | 6/2015 | You et al. | |
| 2015/0194055 A1 | 7/2015 | Maass | |
| 2015/0321699 A1 | 11/2015 | Rebhan et al. | |
| 2015/0353085 A1 | 12/2015 | Lee | |
| 2018/0201272 A1* | 7/2018 | Takeda | B60W 30/10 |
| 2019/0016339 A1* | 1/2019 | Ishioka | B60W 30/0956 |

* cited by examiner

VEHICLE CONTROL SYSTEM

CROSS-REFERENCE TO RELATED APPLICATIONS

This application claims the benefit of U.S. Provisional Application No. 62/397,461, entitled "Vehicle Control System," which was filed on Sep. 21, 2016, and which is incorporated herein by reference in its entirety.

TECHNICAL FIELD

This document relates generally to the automated control of vehicles.

BACKGROUND

Automated vehicle control systems are being developed that take on more and more of the work of maneuvering a vehicle. Automated vehicle control systems are able to access and integrate a wealth of information that is practically unavailable to human operators, such as data from a variety of sensors or communications received from other vehicles or traffic control systems, which fundamentally changes the vehicle control problem and provides an opportunity to automatically maneuver vehicles in a far safer and more efficient manner. However, the real world is highly complex and it is challenging to design automated control systems that can robustly handle the wide variety of scenarios that may be encountered on a road with other automated and/or human operated vehicles.

SUMMARY

In a first aspect, the subject matter described in this specification can be embodied in methods that include determining a kinematic state of a first vehicle moving in a current lane of a road. The methods may include detecting, based at least in part on data from a sensor in the first vehicle, one or more other vehicles that are moving in a target lane of the road that is adjacent to the current lane. The methods may include determining, based at least in part on the kinematic state and a prediction of motion of the one or more other vehicles in the target lane, estimates of headway in relation to at least one of the one or more other vehicles in the target lane. The methods may include determining, based at least in part on the estimates of headway, whether the first vehicle can transition from the current lane to the target lane without violating a set of constraints comprising a minimum headway constraint. The methods may include determining, based at least in part on the estimates of headway, one or more overtake decisions for the one or more other vehicles traveling in the target lane. The methods may include, based at least in part on determining that the first vehicle can transition to the target lane without violating the set of constraints, determining a motion plan that will transition the first vehicle from the current lane to the target lane based at least in part on the one or more overtake decisions. The methods may include maneuvering the first vehicle into the target lane using the motion plan.

In a second aspect, the subject matter described in this specification can be embodied in vehicles that include wheels capable of interfacing with a road with lanes. The vehicles may include a power source connected to the wheels via a transmission system, capable of causing the vehicle to move along the road. The vehicles may include a braking system connected to the wheels for causing the vehicle to slow or stop. The vehicles may include a steering system connected to the wheels, capable of directing one or more of the wheels to direct motion of the vehicle. The vehicles may include a sensor, configured to detect other vehicles near the vehicle. The vehicles may include an automated controller configured to determine a kinematic state of the vehicle as it moves along a current lane on the road. The automated controller may be configured to detect, based at least in part on data from the sensor, one or more other vehicles that are moving in a target lane of the road that is adjacent to the current lane. The vehicles may include a decision maker configured to determine, based at least in part on the kinematic state and a prediction of motion of the one or more other vehicles in the target lane, estimates of headway in relation to at least one of the one or more other vehicles in the target lane. The decision maker may be configured to determine, based at least in part on the estimates of headway, whether the vehicle can transition from the current lane to the target lane without violating a set of constraints comprising a minimum headway constraint. The decision maker may be configured to determine, based at least in part on the estimates of headway, one or more overtake decisions for the one or more other vehicles traveling in the target lane. The vehicles may include a motion planner configured to determine a motion plan that will transition the vehicle from the current lane to the target lane based at least in part on the one or more overtake decisions from the decision maker. The automated controller may be configured to run the decision maker. The automated controller may be configured to, in response to a determination by the decision maker that the vehicle can transition to the target lane without violating the set of constraints, run the motion planner with overtake decisions from the decision maker as input. The automated controller may be configured to control the power source, steering system, and braking system, based on the motion plan from the motion planner, to maneuver the vehicle into the target lane.

In a third aspect, the subject matter described in this specification can be embodied in systems that include a data processing apparatus and a data storage device storing instructions executable by the data processing apparatus that upon execution by the data processing apparatus cause the data processing apparatus to perform operations including determining a kinematic state of a first vehicle moving in a current lane of a road. The operations may include detecting, based at least in part on data from a sensor in the first vehicle, one or more other vehicles that are moving in a target lane of the road that is adjacent to the current lane. The operations may include determining, based at least in part on the kinematic state and a prediction of motion of the one or more other vehicles in the target lane, estimates of headway in relation to at least one of the one or more other vehicles in the target lane. The operations may include determining, based at least in part on the estimates of headway, whether the first vehicle can transition from the current lane to the target lane without violating a set of constraints comprising a minimum headway constraint. The operations may include determining, based at least in part on the estimates of headway, one or more overtake decisions for the one or more other vehicles traveling in the target lane. The operations may include, based at least in part on determining that the first vehicle can transition to the target lane without violating the set of constraints, determining a motion plan that will transition the first vehicle from the current lane to the target lane based at least in part on the one or more overtake decisions. The operations may include maneuvering the first vehicle into the target lane using the motion plan.

Some implementations of the systems and methods described in this document may offer advantages including providing robust motion planning that avoids arbitrary assumptions that might impose unnecessary constraints and limit the ability to successfully change lanes, providing a specialized planner for lane change that can be optimized for these scenarios, or providing a hierarchical approach to motion planning that may avoid the use of complex state machines and avoid a need to stitch/smooth discrete plan segments.

DETAILED DESCRIPTION

This document describes integrated decision making and motion planning solutions for automatically performing lane change maneuvers with a vehicle. A decision making component may determine a behavioral pattern to be followed by an autonomous or automated vehicle and a motion planning component may determine an actual lane change trajectory for performing the lane change maneuver. These components may operate together to efficiently enable successful transition from a current lane to a target lane (e.g., generating a collision free trajectory adhering to the vehicle's dynamics and passenger comfort constraints). For example, the decision making component may determine constraints and/or goals that the motion planning module may use to narrow or focus its search for successful lane change trajectory. These efficiencies may enable a vehicle control system as a whole to consider a wider range or assortment of potential lane change motions than would otherwise be possible or practical.

Headway is a distance (e.g., from bumper to bumper) between two vehicles traveling in the same lane of a road. A headway may also be expressed as a time that it would take a vehicle to travel the distance between the two vehicles at the trailing vehicle's current speed. A minimum headway constraint specifies the minimum headway that should be maintained between vehicles. A minimum headway constraint may be a function of vehicle speed, e.g., the faster a vehicle is moving, the larger the headway maintained should be. A minimum headway constraint may be determined by laws applying on a road. A minimum headway constraint may be a design feature of a vehicle control system added to enhance safety. A minimum headway constraint may be different for the headway maintained to vehicles ahead of the vehicle being controlled (the ego vehicle) than for the headway maintained to vehicles behind the ego vehicle. For example, the ego vehicle may assume responsibility to maintain a larger headway to a vehicle ahead it the ego vehicle than it assumes to maintain headway to a vehicle behind the ego vehicle.

A velocity profile specifies a range of velocities for a vehicle at each of one or more time steps or sub-intervals of an interval of time under consideration. For example, a velocity profile may include a sequence of pairs of maximum and minimum desired or expected velocity for a vehicle corresponding to each time step in a motion planning time window.

Figure 1:
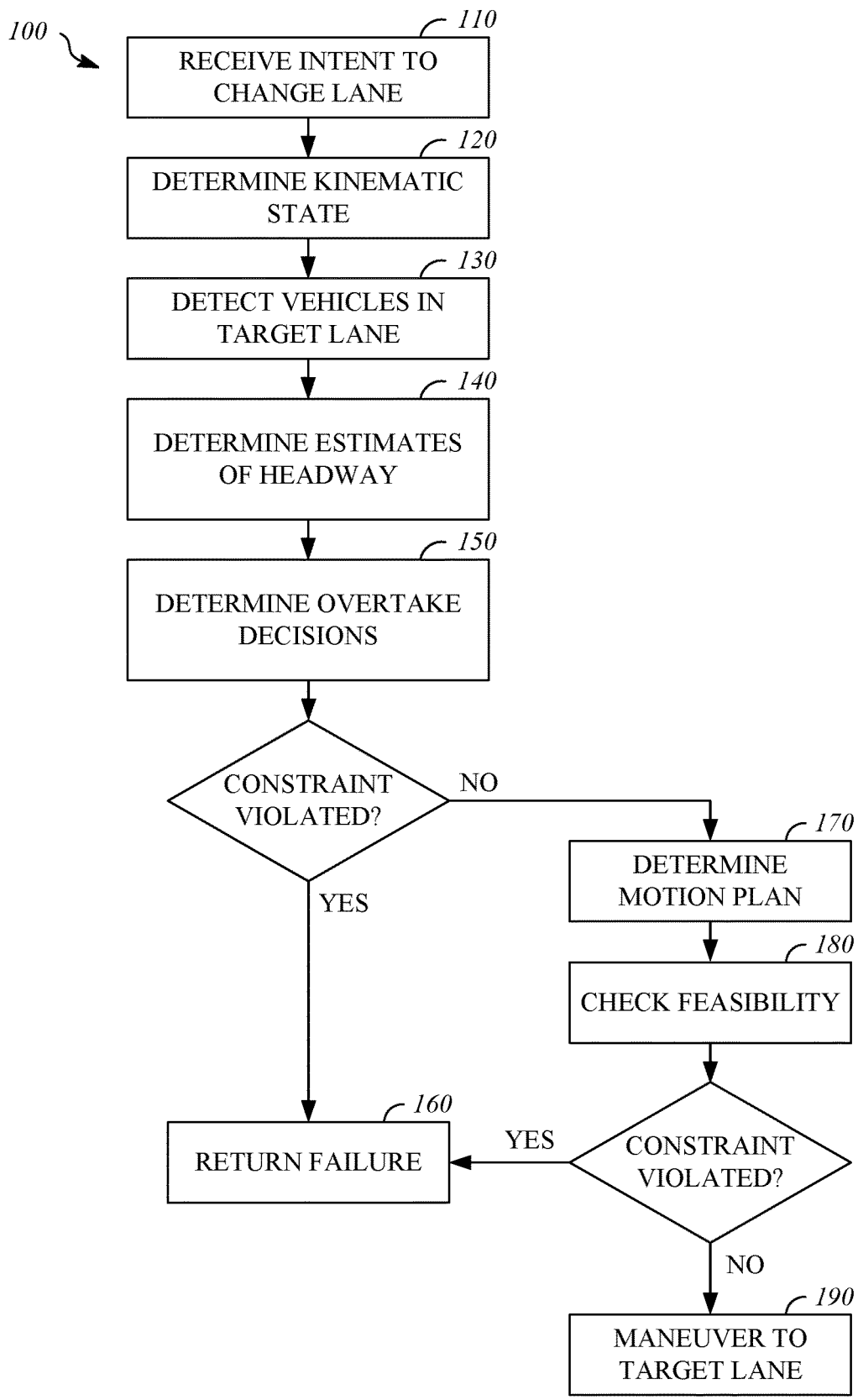
FIG. 1 is a flowchart of an exemplary process for controlling motion of vehicle between lanes on a road.

FIG. 1 shows an example process 100 for controlling the motion of a vehicle, i.e., the ego vehicle. The process 100 may start when an intent for the ego vehicle to change lanes is received 110. In some implementations, the intent to change lanes may be received 110 from a navigation routine running on a control module in the ego vehicle, e.g., when the navigation routine determines that a lane change is needed to access an exit. In some implementations, the intent to change lanes may be received 110 from an operator of the ego vehicle, e.g., via a user interface in the ego vehicle. In some implementations, the intent to change lanes may be received 110 via a wireless communications link with a remote controller of the ego vehicle. The intent to change lanes may specify a target lane into which the ego vehicle should attempt to transition. The target lane may be adjacent to a current lane that the ego vehicle is currently traveling in.

In some implementations, a start time and an end time for the transition between lanes is specified as part of the received 110 intent to change lanes and only that particular time interval for the transition is considered. In some implementations, the intent received 110 may only partially specify the time interval for the transition between lanes, e.g., only specifying an end time by which the transition to the target lane must be completed. In some implementations, the time interval for the transition is not specified at all as part of the intent. For example, an end time specified as part of the intent may be imposed as a constraint on process 100, acting as a time limit within which the vehicle must complete a transition from the current lane into the target lane.

The kinematic state of the vehicle is determined 120. For example, the kinematic state may include the ego vehicle's position, direction, speed, acceleration, and curvature. In some implementations, the kinematic state is determined 120 using motion sensors (e.g., accelerometers, gyroscopes, and/or magnetometers). In some implementations, the kinematic state is determined 120 using a Global Positioning System (GPS) receiver. In some implementations, the kinematic state is determined based on sensor data reflecting the motion and alignment of the wheels of the ego vehicle. In some implementations, the kinematic state is determined 120 by fusing (e.g., using a Kalman filter) information from a variety of different types of sensors and/or positioning systems.

Vehicles in the target lane are detected 130. In some implementations, vehicles in the target lane are detected 130, by processing data from cameras mounted on the ego vehicle. In some implementations, vehicles in the target lane are detected 130, by processing data from a radio detection and ranging (RADAR) system mounted on the ego vehicle. In some implementations, vehicles in the target lane are detected 130, by processing data from a light detection and ranging (LADAR or LIDAR) system mounted on the ego vehicle. In some implementations, vehicles in the target lane are detected 130, by receiving beacon or presence signals from those vehicles via wireless communications and processing those signals. In some implementations, vehicles in the target lane are detected 130, by receiving traffic description messages from a centralized traffic coordinator via wireless communications and processing those messages.

Estimates of headway in relation to the vehicles in the target lane that may be achieved for a lane change are determined 140. The estimates of headway may be determined 140 based in part on the kinematic state of the ego vehicle and predictions of the motion of the vehicles in the target lane. In some implementations, the estimates of headway determined 140 include an estimate of a maximum, over allowed motions, of a minimum, over a time interval corresponding to a transition from the current lane into the target lane, of headway. An example process for determining 140 estimates of headway is described in relation to FIG. 2.

Overtake decisions are determined 150 for the vehicles in the target lane. An overtake decision for a vehicle in the target lane is a binary decision as to whether the ego vehicle will transition into the target lane ahead of this other vehicle or behind this other vehicle in the target lane. An overtake decision to overtake a particular vehicle in the target lane may implicitly specify that all cars in the target lane behind that vehicle will also be overtaken. The overtake decisions may be determined 150 based in part on the estimates of headway. In some implementations, the overtake decisions may be determined 150 to instruct a motion planner to guide the ego vehicle into a gap between cars in the target lane corresponding to the maximum achievable minimum headway over a time interval corresponding to the transition of the ego vehicle from the current lane to the target lane. An example process for determining 140 estimates of headway is described in relation to FIG. 2.

The motions of the ego vehicle are subject to constraints including a minimum headway constraint, e.g., that the ego vehicle should maintain at least a minimum headway in relation to other vehicles on the road at all times. If 155 the estimates of headway determined 150 do not reveal a set of overtake decisions, satisfying this minimum headway constraint, then the process 100 returns failure 160, meaning the attempt to transition the ego vehicle from the current lane to the target during a time interval under consideration will be aborted.

If 155 the estimates of headway indicate that a headway constraint will not be violated, then a motion plan will be determined 170. The motion plan may be determined 170 using a more complete vehicle dynamics model than the simpler kinematic model used to determine 140 the estimates of headway. The motion plan may be determined 170 in part on the overtake decisions determined 150 previously. This may reduce the complexity of the motion plan determination by focusing the search on motion plans satisfying the chosen set of overtake decisions. In some implementations, the motion plan is determined 170 using a constrained iterative linear-quadratic regulator (LQR) optimizer. An example process for determining 170 a motion plan is described in relation to FIG. 5.

The feasibility of the resulting motion plan is checked 180. Each motion state in motion plan is checked 180 to determine whether motion constraints are violated. For example, the constraints checked 180 may include dynamic constraints, comfort constraints and collision constraints. The plan may also be checked 180 to confirm that it follows lane boundaries as desired before, during, and after the transition of the ego vehicle from the current lane to the target lane. Pseudo code for implementing an example feasibility check for a motion plan is provided in appendix 5.

If 185 at any stage of the motion plan a constraint is violated, then process 100 returns failure 160. Otherwise 185, the motion plan is adopted and maneuvering 190 of the ego vehicle to prepare for and/or start the transition to the target lane may commence. In some implementations, a vehicle controller in the ego vehicle maneuvers 190 the ego vehicle by issuing control signals to the power source and transmission system, the steering system, and/or the braking system of the ego vehicle in order to cause the vehicle to transition from the current lane into the target lane.

Process 100 may be used to determine an initial motion plan for the lane change. After this plan is determined, the motion plan may be updated at each planning time step, using process 100 with the initial motion plan as a seed motion plan, to reduce time to convergence and thus complexity of the motion plan determination operation 170. For each of these re-planning iterations, estimates of headway may be determined 140 until ego vehicle crosses into the target lane, at which point the overtaking decisions become moot since any vehicle ahead of the ego vehicle can no longer be overtaken and any vehicle behind the ego vehicle in the target lane will remain behind. In some implementations, re-planning iterations are performed at a frequency of approximately 10 Hz.

When the process 100 returns failure 160, the process 100 may be repeated to consider alternate time intervals for the transition between lanes. Where the time interval for the transition has not been specified or has only been partially specified, the process 100 may be used in an iterative manner to search for the best-suited start time and end time for the transition. In some implementations, the process 100 may first be used to consider a time interval corresponding to a start time of zero (i.e., the current time or next time step planned for) and an end time of the maximum motion plan duration for ego vehicle's control system. The start time and end time may then be adjusted by time step in each iteration. For each time interval for the transition considered, the relative tolerance of the corresponding motion plan may be determined and compared to choose the best or most suited time interval. For example, the tolerance of motion plan may include headway maintained and/or tolerance over comfort constraints on the motion of the ego vehicle (e.g., maximum jerk).

Pseudo code for implementing an example of process 100 is provided in appendix 1.

Figure 2:
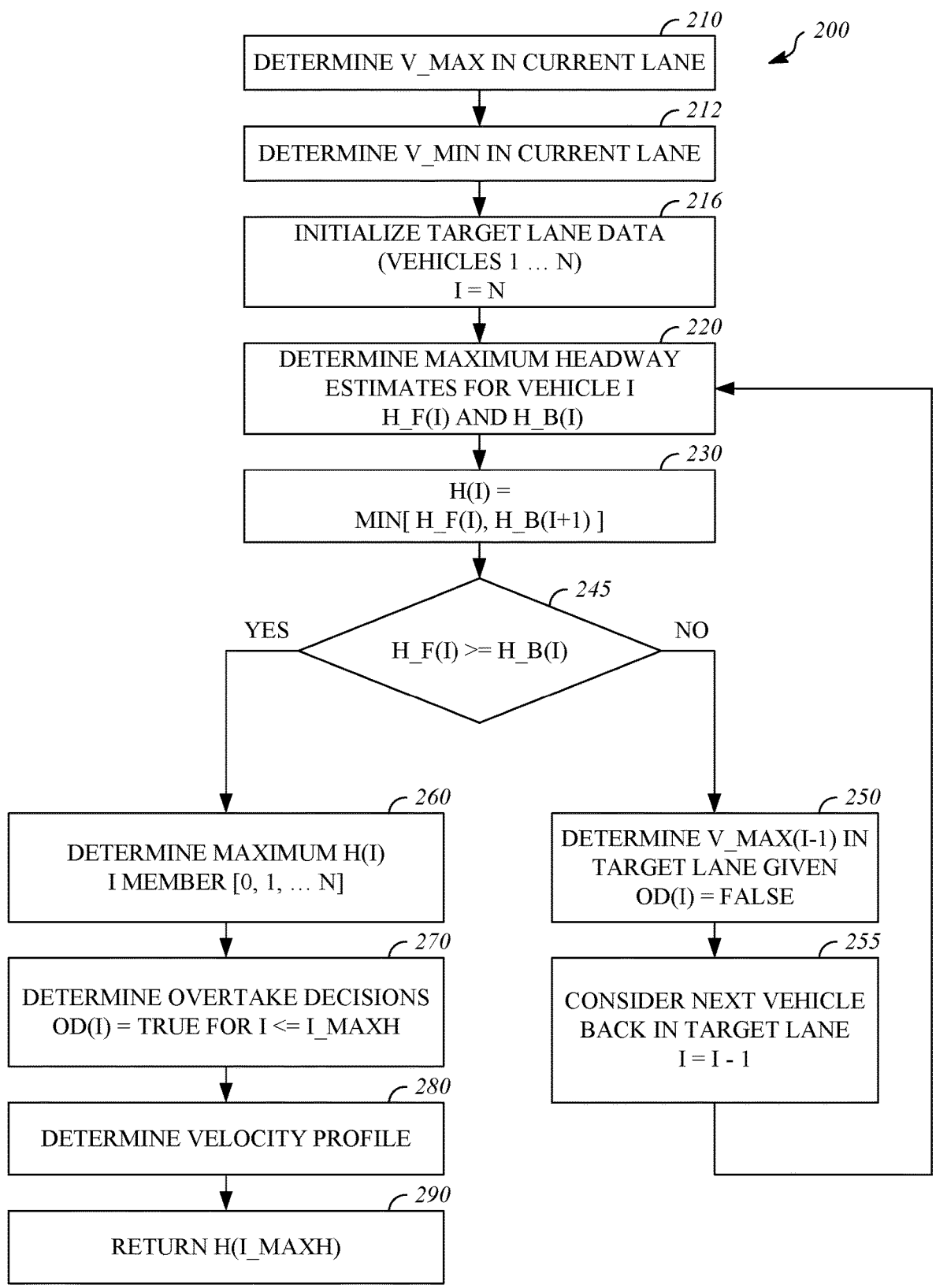
FIG. 2 is a flowchart of an exemplary process for determining estimates of headway and overtake decisions.

FIG. 2 shows an example process 200 for determining headway estimates for a proposed transition of the ego vehicle from a current lane to a target lane. The process 200 may start by determining 210 a maximum velocity in the current lane. The maximum velocity may be bounded by the allowed maximum velocity in the road (e.g., this speed limit may be passed as input to a controller system implementing process 200). The maximum velocity may also be bounded by the velocity profile of the closest vehicle in front of the ego vehicle in the current lane. If the closest vehicle in front is moving slowly, then the ego vehicle might violate a minimum headway constraint with respect to that other vehicle, before exiting the current lane, if the ego vehicle moves too fast. In some implementations, the maximum velocity is determined 210 based on a prediction of the velocity profile for a vehicle ahead of the ego vehicle in the current lane.

A minimum velocity in the current lane may be determined 212. The minimum velocity may be bounded by the allowed minimum velocity in the road (e.g., this speed limit may be passed as input to a controller system implementing process 200). The minimum velocity may also be bounded by the velocity profile of the closest vehicle behind the ego vehicle in the current lane. If the closest vehicle behind is moving fast, then the ego vehicle might violate a minimum headway constraint with respect to that other vehicle, before exiting the current lane, if the ego vehicle moves too slow. In some implementations, the minimum velocity is determined 210 based on a prediction of the velocity profile for a vehicle behind the ego vehicle in the current lane.

The target lane data is initialized 216. Predictions for the motion of the vehicles that have been detected in the target lane may be determined. For example, the predictions may include position and velocity profiles for each of the vehicles in the target lane. The target lane vehicles may be sorted based on their respective motion predictions from the farthest front to the farthest back in the target lane. The process 200 may then start by considering the front most vehicle in the target lane. For example, in the following discussion, it is assumed that there are n vehicles in the target lane and they are sorted and numbered one through n, with vehicle n at the front and vehicle one at the back.

Estimates of the maximum headway in front of and behind a target vehicle under consideration are determined 220. These estimates of headway may be based in part on the kinematic state of the ego vehicle and a prediction of motion for the target lane vehicle under consideration. The estimate of headway in front, h_f(i), of the target lane vehicle may be determined 220 in part based on a maximum velocity (e.g., the maximum velocity determined 210 for the current lane). An example process for determining 220 h_f(i) is described in relation to FIG. 3. The estimate of headway behind, h_b(i), of the target lane vehicle may be determined 220 in part based on a minimum velocity (e.g., the minimum velocity determined 212 for the current lane). An example process for determining 220 h_b(i) is described in relation to FIG. 4.

An overall headway estimate corresponding overtaking the ith vehicle in the target lane (and all vehicles behind it), while not overtaking all vehicles ahead of the ith vehicle is determined 230 and may be denoted as h(i). In some implementations, the overall headway h(i) for this set of overtake decisions may be determined as the minimum of the estimated headway in front of the ith vehicle and the estimate of the head way behind the next vehicle ahead of the ith vehicle. The following edge conditions may be applied to determine the overall headway estimates h(i): h_b(n+1)=∞; h_f(0)=∞.

If 245 the estimate of headway in front of the ith vehicle in the target lane is less than the estimate of headway behind the ith vehicle, then a maximum velocity in the target lane is determined 250 given an overtake decision to not overtake the ith vehicle, OD(i)=false. In some implementations, this maximum velocity is determined 250 based on the prediction of motion for the ith vehicle in the target lane, and a kinematic model of the ego vehicles motion. This maximum velocity, V_max(i−1), may be determined 250 such that a minimum headway constraint is met with respect to driving behind the ith vehicle.

The new maximum velocity, V_max(i−1) may then be used when considering 255 the next vehicle back in the target lane, vehicle i−1, to determine 220 estimates of the maximum headway for this next target vehicle. In this manner, each vehicle in the target lane going back may be considered in turn until condition 245 is met.

If 245 the estimate of headway in front of the ith vehicle in the target lane is greater than or equal to the estimate of headway behind the ith vehicle, then the analysis is complete. A maximum of the overall headways h(i) is determined 260. Only the calculated headway estimates may be considered or equivalently they all may be considered where they were initialized 216 at the start of process 200 to zero.

When the maximum overall headway, h(i_max h), has been determined 260, this information may be used to determine 270 overtake decisions for the vehicles in the target lane. For example, the overtake decisions may be set as OD(i)=true for i<=i_max h; OD(i)=false for i>i_max h.

A desired velocity profile may be determined 280 for the ego vehicle. The velocity profile for the ego vehicle may be determined 280 based in part on the estimates of headway. In some implementations, the velocity profile is specified as a maximum velocity and a minimum velocity for the ego vehicle at each time step during the interval between a start time and an end time for a transition from the current lane to the target lane.

Process 200 may return 290 an estimate of the maximum headway, h(i_max h), to a process that invoked it, e.g., to process 100. This estimate of maximum headway may be used by the calling process to evaluate the proposed lane change maneuver. Overtake decision OD(i) and a velocity profile may also be returned 290 by the process 200 and used to facilitate the determination of motion plan based in part on the foregoing analysis.

Pseudo code for implementing an example of process 200 is provided in appendix 2.

In some implementations, the decision flow for determining overtake decisions for the vehicles in the target lane is as follows:

If only overtaking is practicable, then return success with an overtake decision to overtake all the vehicles (including and behind the vehicle in the target lane under consideration).

If only waiting for is practicable, then adjust the velocity profile (maximum) and process the rest of the vehicles further behind in the target lane to see whether the ego vehicle should overtake those vehicles.

If both overtaking and waiting for is practicable then determine the overtaking headway estimate and waiting for velocity profile, and now process the rest of the vehicles further behind in the target lane to obtain the headway estimates for the rest of these vehicles. Then compare the overtaking and waiting for headway estimates to pick the maximum (as it gives the motion planner the maximum flexibility).

Return failure if neither overtaking or waiting for is possible.

Figure 3:
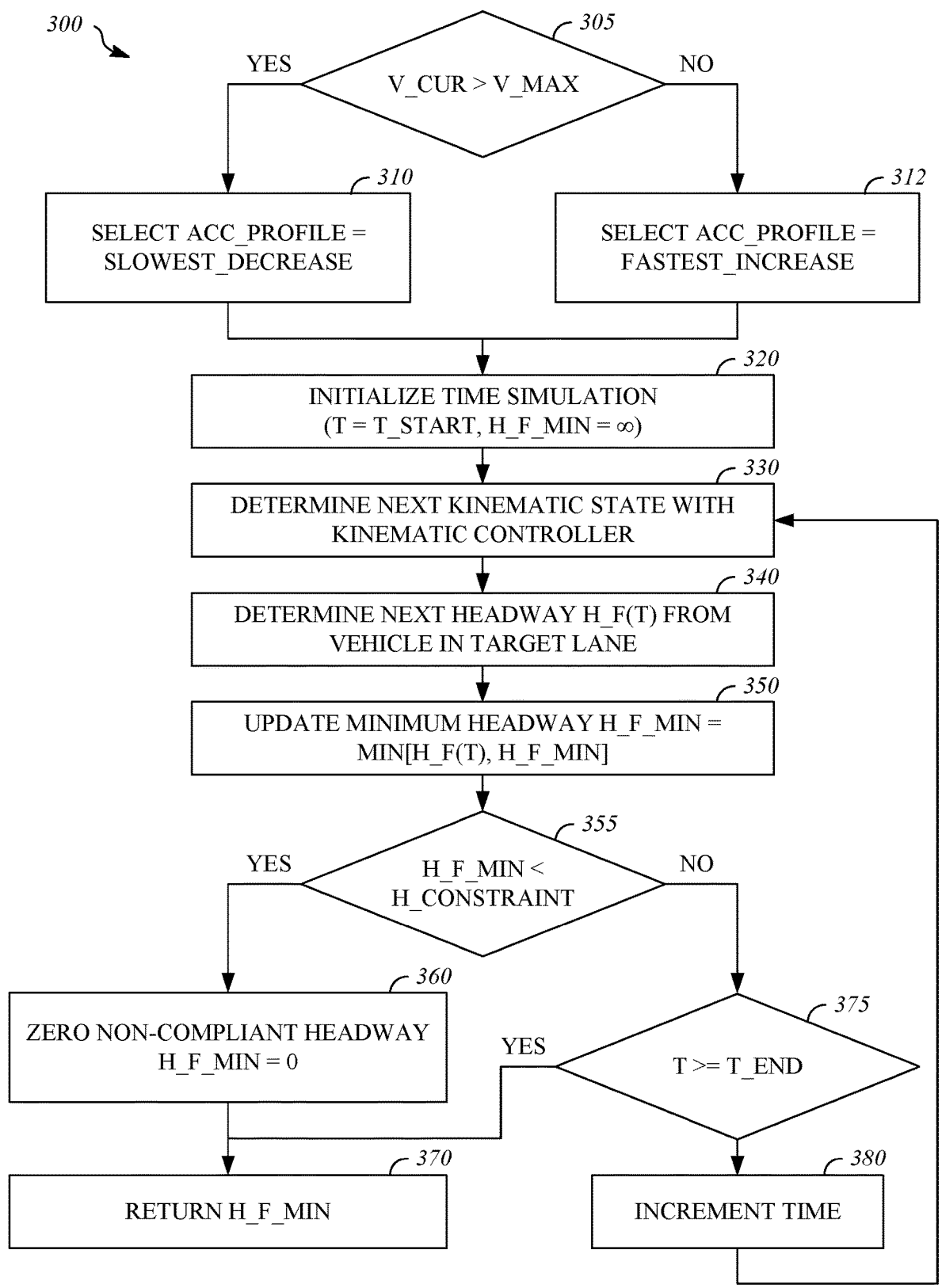
FIG. 3 is a flowchart of an exemplary process for determining estimates of headway ahead of another vehicle.

FIG. 3 shows an example process 300 for determining an estimate of headway in front of a vehicle in the target lane. If 305 the current velocity (v_cur) of the ego vehicle is greater than the maximum velocity (V_max) for the ego vehicle, then an acceleration profile (Acc_Profile) is selected 310 that corresponds to decreasing the velocity of the ego vehicle as slowly as practicable while still reducing to the maximum velocity in time to meet constraints of the proposed lane change and any assumed overtake decisions for previously considered vehicles further ahead in the target lane. For example, the maximum velocity, V_max, may be a maximum velocity in the current lane, determined in a manner described in relation to operation 210 of FIG. 2 or V_max may be a maximum velocity in the target lane that has been determined in a manner described in relation to operation 250 of FIG. 2. In some implementations, the acceleration profile is a discrete mode selection parameter that is passed into a kinematic controller module or routine, which chooses a mode of behavior which in part will determine how the kinematic state of the ego vehicle will evolve during kinematic simulation.

If 305 the current velocity of the ego vehicle is less than or equal to the maximum velocity for the ego vehicle, then an acceleration profile (Acc_Profile) is selected 312 that corresponds to increasing the velocity of the ego vehicle as fast as practicable while still meeting all the constraints of the proposed lane change including, e.g., dynamic constraints and passenger comfort constraints.

A time simulation using a kinematic model that may be used to determine a headway estimate is initialized 320. The time for the simulation may be set to a start time (T_start) for the transition of the ego vehicle from the current lane to the target lane. The estimate of the headway in front of the vehicle in the target lane under consideration may be initialized 320 to the largest value (e.g., the controller system's representation of $\infty$.)

At each time step of the kinematic simulation, a kinematic controller module or routine is used to determine 330 the next kinematic state of the ego vehicle. In some implementations, the kinematic state of the ego vehicle has six degrees of freedom. For example, the kinematic state may include two position coordinates, a yaw angle, an angular velocity or path curvature, a velocity, and a lateral acceleration. The kinematic controller may adjust the acceleration of the kinematic state using jerk control, where jerk is the time derivative of acceleration (d(acc)/dt), a parameter associated with passenger comfort. For example, if the acceleration profile for fastest increase has been selected, the kinematic controller will maximize jerk subject to constraints that may include passenger comfort constraints. The velocity may be increased as fast as practicable without violating constraints including a maximum velocity, a maximum acceleration, and or a maximum jerk. For example, if the acceleration profile for slowest decrease has been selected, the kinematic controller will use the lowest jerk practicable to achieve the target velocity (V_max) with the required time window.

A headway in front of the target lane vehicle under consideration at a simulation time step may be determined 340 based on the ego vehicle's kinematic state at that time step and a prediction of the motion of the target lane vehicle for that time step. In some implementations, the headway in front of this target lane vehicle is determined 340 by calculating a distance between the ego vehicle and the vehicle in the target lane at the time step, which may account for the approximate sizes and shapes of the two vehicles (e.g., in order to determine a bumper to bumper distance estimate). When the headway in front of the target lane vehicle has been determined 340, the estimate of the minimum, over a time interval corresponding to a transition from the current lane into the target lane, headway in front of the target lane vehicle is updated 350, e.g., h_f_min(t)=min[h_f (t), h_f_min(t−1)].

If 355 the updated estimate of the minimum headway in front of the target lane vehicle is less than an applicable minimum headway constraint, then the non-compliant headway may be zeroed 360 in order to equate all violations of the constraint. Once a non-compliant headway has been determined, the process may terminate and return 370 the non-compliant estimate of headway in front of the target lane vehicle under consideration.

If 355 the updated estimate of the minimum headway in front of the target lane vehicle is greater than or equal to an applicable minimum headway constraint, then time may be compared 375 to the end time (T_end) for the time interval corresponding to a transition from the current lane into the target lane. If 375 the time is less than T_end, then the time step is incremented 380 (e.g., t=t+Δt) and the kinematic simulation may be run for the next time step, starting with determining 330 the next kinematic state for the ego vehicle. The time simulation continues iteratively in this manner until either the end of the time interval is reached (t>=T_end) or a minimum headway constraint violation occurs (h_f_min<H_constraint), at which point the simulation will terminate and the latest value of h_f_min may be returned 370 as the estimate of headway in front of the vehicle in the target lane under consideration.

Pseudo code for implementing an example of process 300 is provided in appendix 3.

Figure 4:
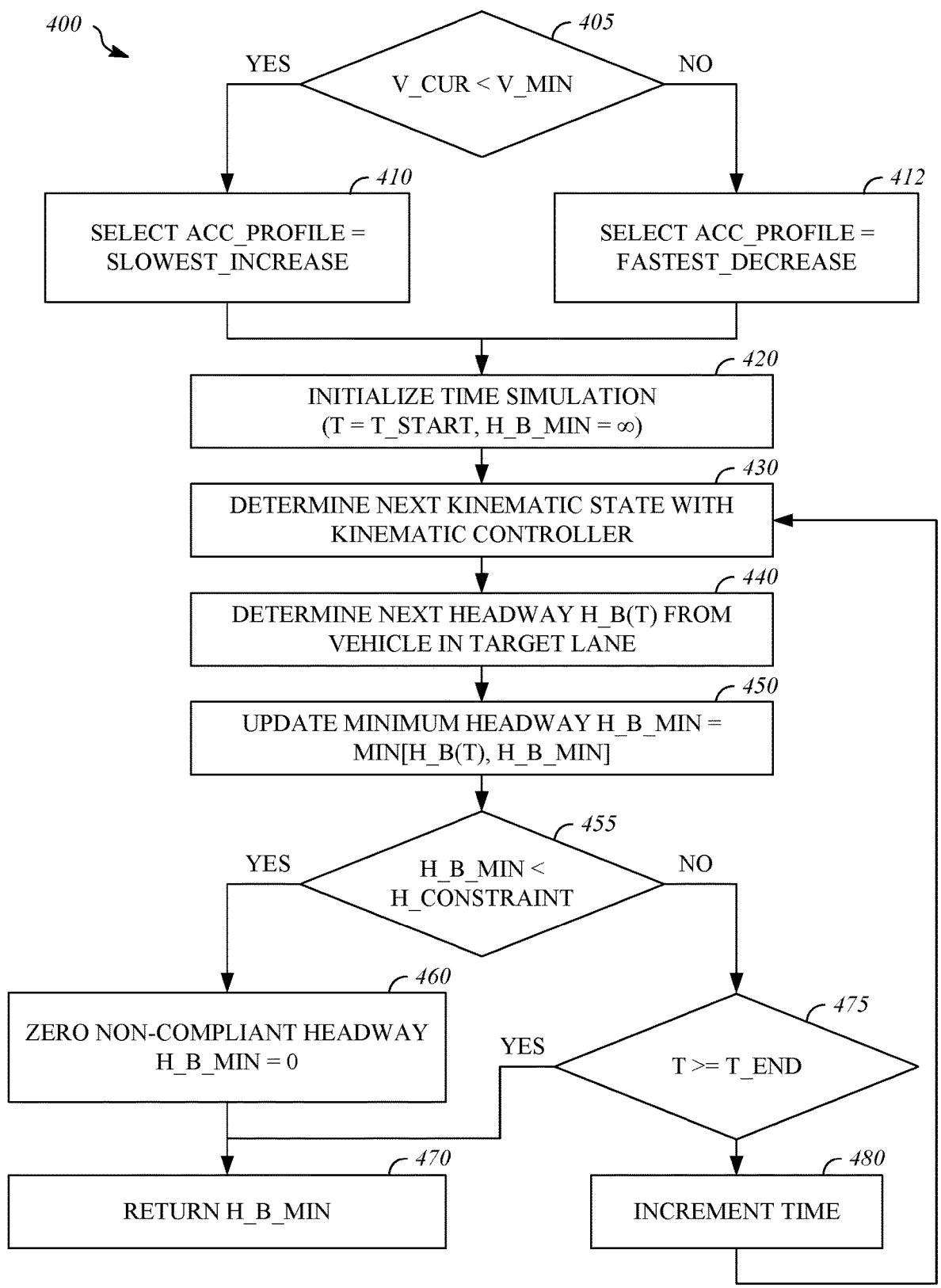
FIG. 4 is a flowchart of an exemplary process for determining estimates of headway behind another vehicle.

FIG. 4 shows an example process 400 for determining an estimate of headway behind a vehicle in the target lane. If 405 the current velocity (v_cur) of the ego vehicle is less than the minimum velocity (V_min) for the ego vehicle, then an acceleration profile (Acc_Profile) is selected 410 that corresponds to increasing the velocity of the ego vehicle as slowly as practicable while still increasing to the minimum velocity in time to meet constraints of the proposed lane change. For example, the maximum velocity, V_min, may be a minimum velocity in the current lane, determined in a manner described in relation to operation 212 of FIG. 2. In some implementations, the acceleration profile is a discrete mode selection parameter that is passed into a kinematic controller module or routine, which chooses a mode of behavior which in part will determine how the kinematic state of the ego vehicle will evolve during kinematic simulation.

If 405 the current velocity of the ego vehicle is greater than or equal to the minimum velocity for the ego vehicle, then an acceleration profile (Acc_Profile) is selected 412 that corresponds to decreasing the velocity of the ego vehicle as fast as practicable while still meeting all the constraints of the proposed lane change including, e.g., dynamic constraints and passenger comfort constraints.

A time simulation using a kinematic model that may be used to determine a headway estimate is initialized 420. The time for the simulation may be set to a start time (T_start) for the transition of the ego vehicle from the current lane to the target lane. The estimate of the headway behind the vehicle in the target lane under consideration may be initialized 420 to the largest value (e.g., the controller system's representation of $\infty$.)

At each time step of the kinematic simulation, a kinematic controller module or routine is used to determine 430 the next kinematic state of the ego vehicle. In some implementations, the kinematic state of the ego vehicle has six degrees of freedom. For example, the kinematic state may include two position coordinates, a yaw angle, an angular velocity or path curvature, a velocity, and a lateral acceleration. The kinematic controller may adjust the acceleration of the kinematic state using jerk control. For example, if the acceleration profile for fastest decrease has been selected, the kinematic controller will maximize jerk subject to constraints that may include passenger comfort constraints. The velocity may be increased as fast as practicable without violating constraints including a minimum velocity, a maximum acceleration, and or a maximum jerk. For example, if the acceleration profile for slowest increase has been selected, the kinematic controller will use the lowest jerk practicable to achieve the target velocity (V_min) with the required time window.

A headway behind the target lane vehicle under consideration at a simulation time step may be determined 440 based on the ego vehicle's kinematic state at that time step and a prediction of the motion of the target lane vehicle for that time step. In some implementations, the headway behind this target lane vehicle is determined 440 by calculating a distance between the ego vehicle and the vehicle in the target lane at the time step, which may account for the approximate sizes and shapes of the two vehicles (e.g., in order to determine a bumper to bumper distance estimate). When the headway behind the target lane vehicle has been determined 440, the estimate of the minimum, over a time interval corresponding to a transition from the current lane into the target lane, headway behind the target lane vehicle is updated 450, e.g., h_b_min(t)=min[h_b(t), h_b_min(t−1)].

If 455 the updated estimate of the minimum headway behind the target lane vehicle is less than an applicable minimum headway constraint, then the non-compliant headway may be zeroed 460 in order to equate all violations of the constraint. Once a non-compliant headway has been determined, the process may terminate and return 470 the non-compliant estimate of headway behind the target lane vehicle under consideration.

If 455 the updated estimate of the minimum headway behind the target lane vehicle is greater than or equal to an applicable minimum headway constraint, then time may be compared 375 to the end time (T_end) for the time interval corresponding to a transition from the current lane into the target lane. If 375 the time is less than T_end, then the time step is incremented 380 (e.g., t=t+Δt) and the kinematic simulation may be run for the next time step, starting with determining 430 the next kinematic state for the ego vehicle. The time simulation continues iteratively in this manner until either the end of the time interval is reached (t>=T_end) or a minimum headway constraint violation occurs (h_b_min<H_constraint), at which point the simulation will terminate and the latest value of h_b_min may be returned 470 as the estimate of headway behind the vehicle in the target lane under consideration.

Pseudo code for implementing an example of process 400 is provided in appendix 4.

Figure 5:
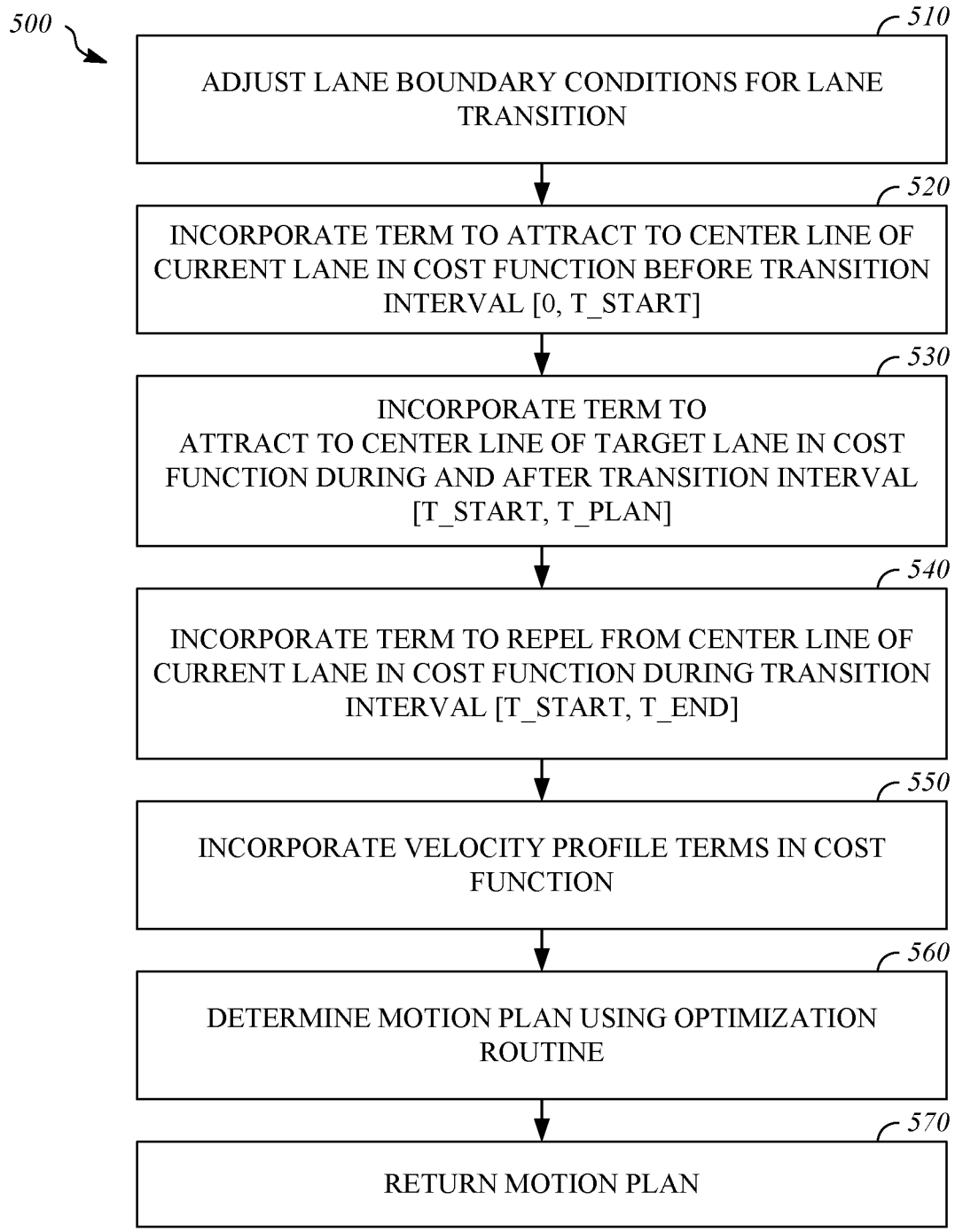
FIG. 5 is a flowchart of an exemplary process for determining a motion plan.

FIG. 5 shows an example process 500 for determining a motion plan for the ego vehicle. In some implementations, the motion plan is determined 560 using an optimization module or routine to search the space of motion plans for over a planning time interval for a motion plan that fits one or more constraints and results in favorable scores of a specified cost function. For example, the motion plan may be determined 560 using a constrained iterative LQR optimizer as an optimization module or routine.

To setup the search for a good motion plan, one or more constraints passed to the optimization module or routine may be adjusted 510 to reflect changing lane boundaries during different phases of the motion plan to transition the ego vehicle from the current lane to the target lane. In some implementations, the lane boundaries may be adjusted 510 such that only the current lane (and the vehicles and any other objects in it) is available for consideration for motion planning during a preparation phase from the current time until the start of the transition (0<=t<T_start); both the current lane and the target lane are available for motion planning during an execution phase from the start time to the end time of the transition (T_start<=t<=T_end); and only the target lane is available for motion planning during a completion phase from the end time of the transition to the end of the motion planning time window (T_end<t<=T_plan). See FIG. 8 and its related discussion infra for a more detailed description of these phases of the motion plan to change lanes.

One or more terms designed to attract or repel the ego vehicle towards or away from the center lines of the current lane and target lane may be incorporated 520, 530, 540 into the cost function used by the optimization module or routine in order to guide the ego vehicle during different phases of the motion plan to transition the ego vehicle from the current lane to the target lane. In some implementations, a term is incorporated 520 in the cost function to attract the ego vehicle to the center line of the current lane during a preparation phase from the current time until the start of the transition (0<=t<T_start); a term is incorporated 530 to attract the ego vehicle to the center line of the target lane during an execution phase and a completion phase from the start time of the transition until the end of the motion planning time window (T_start<=t<T_plan); and a term is incorporated 540 in the cost function to repel the ego vehicle away from the center line of the current lane during an execution phase from the start time until the end time of the transition (T_start<=t<T_end).

One or more terms reflecting a desired velocity profile for the ego vehicle during motion planning window may be incorporated 550 in the cost function of the motion planning optimization module or routine. For example, one or more terms may be incorporated in the cost function that are based on a velocity profile for the ego vehicle determined as discussed in relation to operation 280 of the process 200 of FIG. 2. These cost function term(s) may serve to guide the motion planner to direct the ego vehicle to stay within the ranges of the velocity profile at each time step of the motion plan without imposing any hard constraint on the motion plan that might cause a failure to find a valid motion plan. In some implementations, one or more terms reflecting the desired velocity profile impose a quadratic penalty for straying outside of the velocity limits of the velocity profile and they include a linear reward for staying within and away from the velocity limits (e.g., near the center of each velocity range) of the velocity profile.

For example, a cost function term may be incorporated into the cost function by adding the term to zero or more additional terms of the cost function. In some implementations, a weighting coefficient may be included in the incorporated term or multiply the term to control the importance or effect of that term relative to other terms in the cost function. Many different combinations of the above mentioned cost function terms similar to those described may be incorporated in the cost function and many different weightings may be assigned to each term to balance the relative importance of the terms and achieve a desired performance from the motion planning optimization module or routine.

Once the constraints have been updated and all terms have been incorporated in the cost function of the motion planning module or routine, the optimization module or routine may be used to determine 560 a motion plan satisfying the constraints and achieving a favorable value of the cost function. For example, an iterative LQR optimizer module or routine may be used with a cost function including a vector of cost terms chosen to optimize the trajectory for the ego vehicle specified by the resulting motion plan. The resulting motion plan is then returned 570 for further consideration and/or implementation by a higher-level vehicle controller module or routine.

Pseudo code for implementing an example of process 500 is provided in appendix 5.

Figure 6:
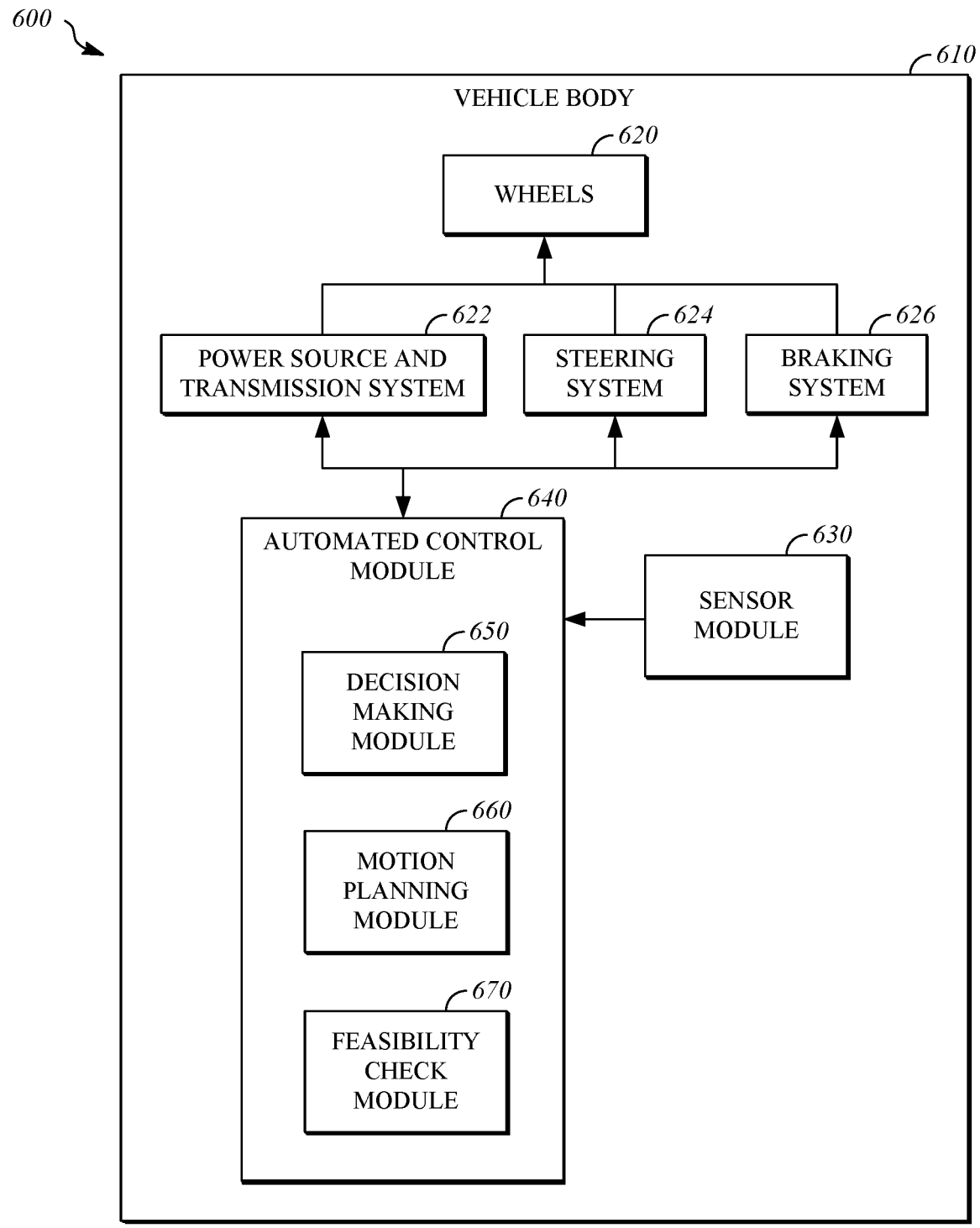
FIG. 6 is a block diagram of an exemplary vehicle.

FIG. 6 shows an example vehicle 600 configured for automated lane change maneuvers. The vehicle 600 includes a vehicle body 610 that contains or is attached to the other systems and components of the vehicle 600. The vehicle 600 includes wheels 620 that are capable of serving as an interface between the vehicle and a road. The wheels provide control surfaces that may be used to guide the vehicle along paths on a road. The vehicle 600 includes a power source (e.g., a combustion engine and/or a battery) connected to the wheels via a transmission system 622 capable of spinning the wheels to accelerate the vehicle along a road. The vehicle 600 includes a steering system 624 capable of turning the wheels 620 in relation to the vehicle body 610 to direct the motion of the vehicle, e.g., by controlling the yaw angle and angular velocity or path curvature of the vehicle. The vehicle 600 includes a sensor module 630, configured to detect other vehicles near the vehicle 600. In some implementations, the sensor module 630 includes one or more cameras mounted around the vehicle 600. In some implementations, the sensor module 630 includes a radar system. In some implementations, the sensor module 630 includes a LADAR or LIDAR system. In some implementations, the sensor module 630 includes a receiver for wireless beacon or presence signals broadcast by other vehicles on the road. In some implementations, the sensor module 630 includes wireless receiver for traffic description messages from a centralized traffic coordinator.

The vehicle 600 includes an automated control module 640 that is configured to receive data from the sensor module 230 and possibly other sources (e.g., a vehicle passenger/operator control interface) and process the data to implement automated control of the motion of the vehicle 600 by sending control signals to the power source & transmission system 622, the steering system 624, and the braking system 626 that are actuated by these systems via the wheels 620. In some implementations, the automated control module 640 is configured to determine a kinematic state of the vehicle 600 as it moves along a current lane on the road and detect, based at least in part on data from the sensor module, one or more other vehicles that are moving in a target lane of the road that is adjacent to the current lane. For example, the automated control module 640 may be configured to implement process 200 as described in relation to FIG. 1. The automated control module 640 may include specialized data processing and control hardware and/or software running on a data processing apparatus with additional capabilities.

The automated control module 640 may include or interface with a decision making module 650 that is configured to determine, based at least in part on a kinematic state of the vehicle 600 and prediction of motion of one or more other vehicles in the target lane, estimates of headway in relation to at least one of the one or more other vehicles in the target lane. The decision making module 650 may be configured to determine, based at least in part on the estimates of headway, whether the vehicle 600 can transition from the current lane to the target lane without violating a set of constraints comprising a minimum headway constraint. The decision making module 650 may be configured to determine, based at least in part on the estimates of headway, one or more overtake decisions for the one or more other vehicles traveling in the target lane. For example, the decision making module 650 may be configured to implement process 200 as described in relation to FIG. 2. The decision making module 650 may include specialized data processing and control hardware and/or software running on a data processing apparatus with additional capabilities.

The automated control module 640 may include or interface with a motion planning module 660 that is configured to determine a motion plan that will transition the vehicle 600 from the current lane to the target lane based at least in part on the one or more overtake decisions from the decision making module 650. For example, the motion planning module 660 may be configured to implement process 500 as described in relation to FIG. 5. The motion planning module 660 may include specialized data processing and control hardware and/or software running on a data processing apparatus with additional capabilities.

The automated control module 640 may include or interface with a feasibility check module 670 that is configured to check motion plans for violations of constraints comprising dynamic, comfort, and collision constraints. For example, the feasibility check module 670 may be configured to implement operation 180 of process 100 as described in relation to FIG. 1. The feasibility check module 670 may include specialized data processing and control hardware and/or software running on a data processing apparatus with additional capabilities.

Figure 7:
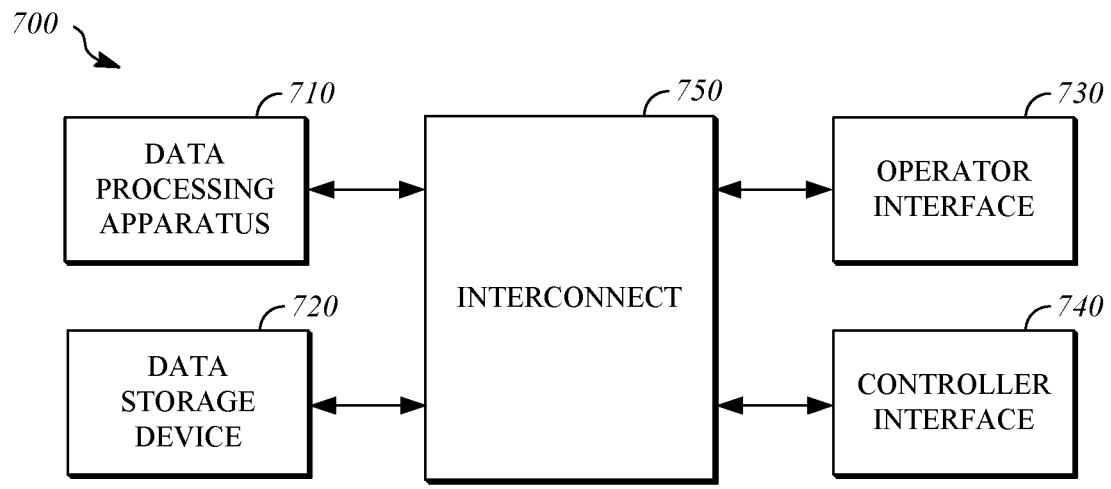
FIG. 7 is a block diagram of exemplary hardware configuration for a vehicle controller.

FIG. 7 shows an example hardware configuration for a vehicle controller 700 configured to control automated lane change maneuvers for a vehicle, such as the vehicle 600. The hardware configuration may include a data processing apparatus 710, a data storage device 720, an operator interface 730, a controller interface 740, and an interconnect 750 through which the data processing apparatus 710 may access the other components. The data processing apparatus 710 is operable to execute instructions that have been stored in a data storage device 720. In some implementations, the data processing apparatus 710 is a processor with random access memory for temporarily storing instructions read from the data storage device 720 while the instructions are being executed. For example, the data storage device 720 may be a non-volatile information storage device such as a hard drive or a solid-state drive. The operator interface 730 facilitates communication with an operator or passenger in a vehicle and may include any type of human-machine interface such as buttons, switches, a keyboard, a mouse, a touchscreen input device, a gestural input device, an audio input device, a display, and/or a speaker. The controller interface 740 allows input and output of information to other systems within a vehicle to facilitate automated control of the vehicle. For example, the controller interface 740 may include serial ports (e.g., RS-232 or USB) used to issue control signals to actuators in the vehicle and to receive sensor data from a sensor module. For example, the interconnect 750 may be a system bus, or a wired or wireless network.

Figure 8:
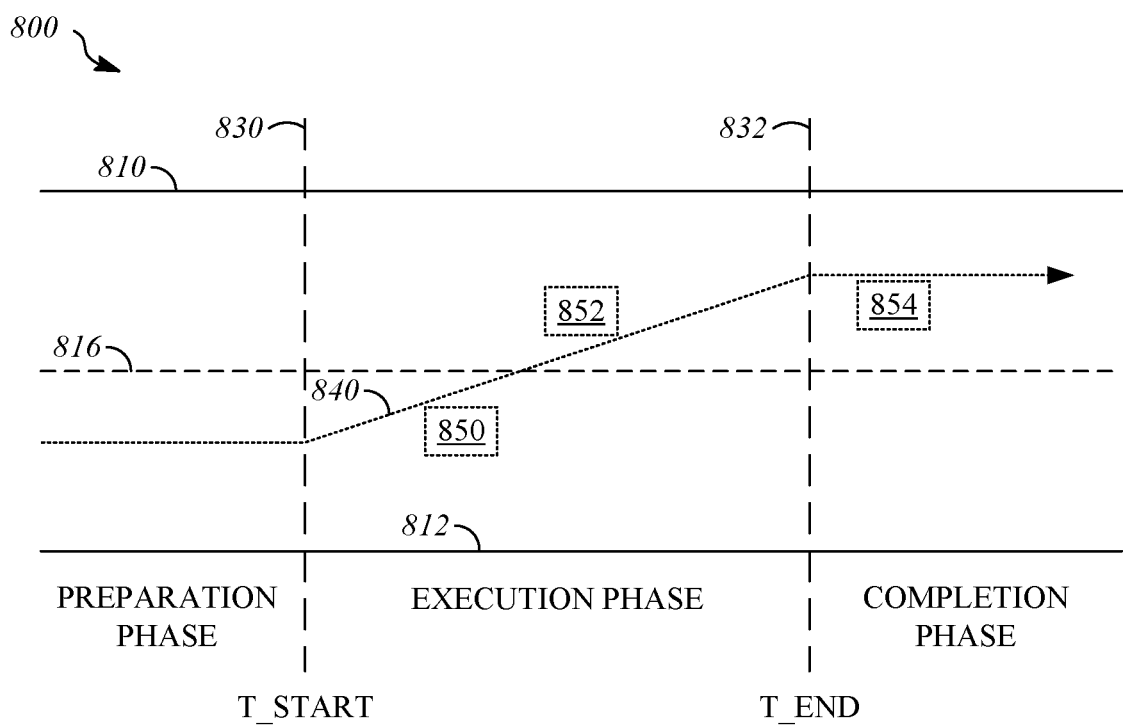
FIG. 8 is an illustration of an exemplary maneuver of a vehicle.

FIG. 8 illustrates an exemplary lane change maneuver 800 of a vehicle, such as the vehicle 600. The lane change maneuver 800 will be executed on a road 810 that is divided into two lanes separated by a lane divider 816. The vehicle is in a current position 820 in the current lane, which is below the lane divider 816. A motion plan is determined to transition the vehicle from the current lane to the target lane, which is above lane divider 816. The overall planning of the maneuver is divided in three phases, i) Preparation phase: where the ego vehicle adjusts its speed/acceleration etc., to perform the lane change; ii) Execution phase: where the actual lane transition is performed; and iii) Completion phase: where the ego vehicle is fully in the target lane, it adjusts its speed/acceleration profile etc. for in lane motion. The planning problem may define these phase durations either fully (overall planning horizon, start and end of execution phase) or partially. At the start time 830 (T_start), the vehicle will begin its transition from the current lane into the target lane, moving along a path 840, and taking future positions 850 and 852 as it crosses the lane divider 816. The transition will be completed by the end time 832 (T_end), at which point the vehicle will continue moving along path 840 taking future positions in the target lane, e.g., position 854. In some implementations, terms relating to center line 862 of the target lane and/or a center line 864 of the current lane may be incorporated in a cost function of an optimization routine used by a motion planning module to determine a motion plan for the lane transition.

APPENDIX 1

```
procedure LANECHANGE
    hsucc ← COMPUTELANECHANGEHEURISTICS
    if (hsucc) then
        plan ← COMPUTEMOTIONPLAN
        psucc ← CHECKPLANFEASIBILITY(plan)
        if (psucc) then
            return (success; plan)
    return failure
```

APPENDIX 2

```
procedure COMPUTEOVERTAKINGDECISION(i, v_max, v_min)
    if (i == 0) then
        return ∞
    h_f ← COMPUTEHEADWAYAHEAD(target_lane_vehicle[i], v_max, v_min)
    h_b ← COMPUTEHEADWAYBEHIND(target_lane_vehicle[i], v_max, v_min)
    if (max(h_b, h_f) ≤ -∞) then return -∞
    else if (h_f ≥ h_b) then
        Overtake i . . . 1; return h_f
    else
        v_max ← Adjust v_max for waiting
        h_b ← min(h_b, COMPUTEOVERTAKINGDECISION(i - 1, v_max, v_min))
        if (h_f ≥ h_b) then
            Overtake i . . . 1
            return h_f
        else
            Wait for i
            return h_b
procedure COMPUTELANECHANGEHEURISTIC
    v_max ← COMPUTEMAXVELOCITYEGOLANE
    v_min ← COMPUTEMINVELOCITYEGOLANE
    SORTTARGETLANEVEHICLES
    headway ← COMPUTEOVERTAKINGDECISION(n, v_max, v_min)
    if (headway > -∞) then
        return success
    else
        return failure
```

APPENDIX 3

```
procedure COMPUTEHEADWAYAHEAD(vehicle_i, v_max, v_min)
    if (v_cur > v_max) then
        acc_profile ← slowest_decrease
    else
        acc_profile ← fastest_increase
    h_f ← ∞
    for (Each time step in target lane) do
        v_state ← SIMPLECONTROLLER(acc_profile, v_cur, v_max, v_min)
        h_f ← min(h_f, CALCULATEHEADWAY(v_state, vehicle_i))
        if (h_f < constraint_HeadwayAhead) then
            h_f ← -∞
            Break
    return h_f
```

APPENDIX 4

```
procedure COMPUTEHEADWAYBEHIND(vehicle_i, v_max, v_min)
    if (v_cur < v_min) then
        acc_profile ← slowest_increase
    else
        acc_profile ← fastest_decrease
    h_b ← ∞
```

APPENDIX 4-continued

```
    for (Each time step in target lane) do
        v_state ← SIMPLECONTROLLER(acc_profile, v_cur, v_max, v_min)
        h_b ← min(h_b, COMPUTEHEADWAY(v_state, vehicle_i))
        if (h_b < constraint_HeadwayBehind) then
            h_b ← ∞
            Break
    return h_b
```

APPENDIX 5

```
procedure COMPUTEMOTIONPLAN
    Adjust lane boundaries such that {
        Only ego lane is available for planning for time 0 ≤ t < T_s
        Both lanes are available for planning for time T_s ≤ t ≤ T_e
        Only target lane is available for planning for time T_e < t ≤ T_p
    }
```

APPENDIX 5-continued

```
    Adjust cost functions such that {
        Ego lane center line attracts the vehicle for time 0 ≤ t < T_s
        Ego lane center line repels the vehicle for time T_s ≤ t ≤ T_e
        Target lane center line attracts the vehicle for time T_s ≤ t ≤ T_p
```

APPENDIX 5-continued

```
}
Adjust cost functions to prefer the velocity profiles
plan ← ILQROPTIMIZATION( )
return plan
```

What is claimed is:

1. A method, comprising:
    detecting, based at least in part on data from a sensor in a first vehicle moving in a current lane of a road, one or more other vehicles that are moving in a target lane of the road that is adjacent to the current lane;
    determining, based at least in part on a prediction of motion of the one or more other vehicles in the target lane, estimates of headway in relation to at least one of the one or more other vehicles in the target lane;
    determining, based at least in part on the estimates of headway, one or more overtake decisions for the one or more other vehicles traveling in the target lane, wherein the estimates of headway include an estimate of a maximum, over allowed motions given a minimum headway constraint, of minimums, over a time interval corresponding to a transition from the current lane into the target lane, of headway;
    determining a motion plan that will transition the first vehicle from the current lane to the target lane based at least in part on the one or more overtake decisions; and
    maneuvering the first vehicle into the target lane using the motion plan.

2. The method of claim 1, further comprising:
    determining, based at least in part on the estimates of headway, a velocity profile for the first vehicle, wherein a term based on the velocity profile is incorporated in a cost function that is used to determine the motion plan.

3. The method of claim 1, wherein determining the estimates of headway includes:
    determining a maximum velocity in the current lane, for the first vehicle, based in part on a prediction of motion of a second vehicle in the current lane that is ahead of the first vehicle;
    determining a minimum velocity in the current lane, for the first vehicle, based in part on a prediction of motion of a third vehicle in the current lane that is behind the first vehicle; and
    determining a maximum headway ahead and a maximum headway behind a first of the one or more other vehicles in the target lane based in part on the maximum velocity in the current lane and the minimum velocity in the current lane.

4. The method of claim 3, further comprising:
    determining a second maximum velocity in the target lane, for the first vehicle, given an overtake decision for the first of the one or more other vehicles in the target lane to not overtake; and
    determining, based in part on the second maximum velocity in the target lane, a maximum headway ahead of a second of the one or more other vehicles in the target lane.

5. The method of claim 1, further comprising:
    determining, based at least in part on the estimates of headway, a start time for transition of the first vehicle from the current lane to the target lane; and
    determining, based at least in part on the estimates of headway, an end time for transition of the first vehicle from the current lane to the target lane.

6. The method of claim 1, wherein determining the motion plan includes:
    incorporating a first term, which repels the first vehicle from a center line of the current lane, in a cost function that is used to determine the motion plan; and
    incorporating a second term, which attracts the first vehicle to the center line of the target lane, in the cost function that is used to determine the motion plan.

7. The method of claim 1, further comprising:
    checking the motion plan for violations of one or more further constraints comprising dynamic, comfort, and collision constraints.

8. The method of claim 1, further comprising:
    determining, based at least in part on the estimates of headway, whether the first vehicle can transition from the current lane to the target lane without violating a set of constraints comprising the minimum headway constraint, wherein the motion plan is determined based at least in part on determining that the first vehicle can transition to the target lane without violating the set of constraints.

9. The method of claim 8, wherein the set of constraints includes a time limit within which the first vehicle must complete transition from the current lane into the target lane.

10. A vehicle, comprising:
    wheels capable of interfacing with a road with lanes;
    a power source connected to the wheels via a transmission system, capable of causing the vehicle to move along the road;
    a braking system connected to the wheels for causing the vehicle to slow or stop;
    a steering system connected to the wheels, capable of directing one or more of the wheels to direct motion of the vehicle;
    a sensor configured to detect other vehicles near the vehicle;
    an automated controller to:
        detect, based at least in part on data from the sensor captured as the vehicle moves along a current lane of the road, one or more other vehicles that are moving in a target lane of the road that is adjacent to headway determine;
        determine, based at least in part on a prediction of motion of the one or more other vehicles in the target lane, estimates of headway in relation to at least one of the one or more other vehicles in the target lane; and
        determine, based at least in part on the estimates of headway, one or more overtake decisions for the one or more other vehicles traveling in the target lane, wherein the estimates of headway include an estimate of a maximum, over allowed motions given a minimum headway constraint, of minimums, over a time interval corresponding to a transition from the current lane into the target lane, of headway; determine
    a motion plan that will transition the vehicle from the current lane to the target lane based at least in part on the one or more overtake decisions; and control the power source, steering system, and braking system, based on the motion plan, to maneuver the vehicle into the target lane.

11. The vehicle of claim 10, further comprising:
    a feasibility checker, executed by the automated controller, to check the motion plan for violations of one or more constraints comprising dynamic, comfort, and collision constraints; and wherein the automated controller is further to run the feasibility checker to verify the motion plan from the motion planner.

12. A system, comprising:
a data processing apparatus; and
a non-transitory data storage device storing instructions executable by the data processing apparatus that upon execution by the data processing apparatus cause the data processing apparatus to perform operations comprising:
 detecting, based at least in part on data from a sensor in a first vehicle moving in a current lane of a road, one or more other vehicles that are moving in a target lane of the road that is adjacent to the current lane;
 determining, based at least in part on a prediction of motion of the one or more other vehicles in the target lane, estimates of headway in relation to at least one of the one or more other vehicles in the target lane;
 determining, based at least in part on the estimates of headway, one or more overtake decisions for the one or more other vehicles traveling in the target lane, wherein the estimates of headway include an estimate of a maximum, over allowed motions given a minimum headway constraint, of minimums, over a time interval corresponding to a transition from the current lane into the target lane, of headway;
 determining a motion plan that will transition the first vehicle from the current lane to the target lane based at least in part on the one or more overtake decisions; and
 maneuvering the first vehicle into the target lane using the motion plan.

13. The system of claim 12, the operations further comprising:
 determining, based at least in part on the estimates of headway, a velocity profile for the first vehicle, wherein a term based on the velocity profile is incorporated in a cost function that is used to determine the motion plan.

14. The system of claim 12, wherein determining the estimates of headway includes:
 determining a maximum velocity in the current lane, for the first vehicle, based in part on a prediction of motion of a second vehicle in the current lane that is ahead of the first vehicle;
 determining a minimum velocity in the current lane, for the first vehicle, based in part on a prediction of motion of a third vehicle in the current lane that is behind the first vehicle; and
 determining a maximum headway ahead and a maximum headway behind a first of the one or more other vehicles in the target lane based in part on the maximum velocity in the current lane and the minimum velocity in the current lane.

15. The system of claim 14, the operations further comprising:
 determining a second maximum velocity in the target lane, for the first vehicle, given an overtake decision for the first of the one or more other vehicles in the target lane to not overtake; and
 determining, based in part on the second maximum velocity in the target lane, a maximum headway ahead of a second of the one or more other vehicles in the target lane.

16. The system of claim 12, the operations further comprising:
 determining, based at least in part on the estimates of headway, a start time for transition of the first vehicle from the current lane to the target lane and
 determining, based at least in part on the estimates of headway, an end time for transition of the first vehicle from the current lane to the target lane.

17. The system of claim 12, wherein determining the motion plan includes:
 incorporating a first term, which repels the first vehicle from a center line of the current lane, in a cost function that is used to determine the motion plan; and
 incorporating a second term, which attracts the first vehicle to the center line of the target lane, in the cost function that is used to determine the motion plan.

18. The system of claim 12, the operations further comprising:
 checking the motion plan for violations of one or more further constraints comprising dynamic, comfort, and collision constraints.

19. The system of claim 12, the operations further comprising:
 determining, based at least in part on the estimates of headway, whether the first vehicle can transition from the current lane to the target lane without violating a set of constraints comprising the minimum headway constraint, wherein the motion plan is determined based at least in part on determining that the first vehicle can transition to the target lane without violating the set of constraints.

20. The system of claim 19, wherein the set of constraints includes a time limit within which the first vehicle must complete transition from the current lane into the target lane.

* * * * *

UNITED STATES PATENT AND TRADEMARK OFFICE
CERTIFICATE OF CORRECTION

PATENT NO. : 10,800,416 B2
APPLICATION NO. : 15/707281
DATED : October 13, 2020
INVENTOR(S) : Sandip Aine It is certified that error appears in the above-identified patent and that said Letters Patent is hereby corrected as shown below:

In the Claims

Column 17, Claim 3, Line 48, "behind a first of the" should read --behind a first other vehicle of the--.

Column 17, Claim 4, Line 55, "the first of the one" should read --the first other vehicle of the one--.

Column 17, Claim 4, Line 59, "second of the one" should read --second other vehicle of the one--.

Column 18, Claim 10, Line 41, "adjacent to headway determine;" should read --adjacent to the current lane;--.

Column 18, Claim 11, Line 63, "further comprising: a feasibility checker, executed by the automated controller," should read --wherein the automated controller is further configured to:--.

Column 18, Claim 11, Line 66, "more constraints" should read --more further constraints--.

Column 18, Claim 11, Line 67, "constraints; and wherein the automated controller is further to run the feasibility checker to verify the motion plan from the motion planner." should read --constraints.--.

Column 20, Claim 14, Line 2, "behind a first of the" should read --behind a first other vehicle of the--.

Column 20, Claim 15, Line 10, "the first of the" should read --the first other vehicle of the--.

Column 20, Claim 15, Line 14, "second of the one" should read --second other vehicle of the one--.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*